United States Patent
Nakata et al.

[15] 3,648,519
[45] Mar. 14, 1972

[54] MULTIPLE FREE WHEEL FOR A BICYCLE

[72] Inventors: Kikunori Nakata; Etsuji Kishida, both of c/o Shimano Ind. Co., Ltd. No. 77, 33-cho Oimatsa-cho, Sakai, Osaka, Japan

[22] Filed: June 4, 1970

[21] Appl. No.: 43,388

[30] Foreign Application Priority Data

Mar. 3, 1970 Japan..................................45/21106
Oct. 8, 1969 Japan..................................44/96322

[52] U.S. Cl.............................................................74/217 B
[51] Int. Cl......................................F16h 9/24, F16h 11/04
[58] Field of Search...............................................74/217 B

[56] References Cited

UNITED STATES PATENTS 3,448,628  6/1969  Shimano et al..................74/217 B
3,492,883  2/1970  Maeda..............................74/217 B Primary Examiner—Leonard H. Gerin
Attorney—McGlew and Toren

[57] ABSTRACT

In a bicycle a free wheel comprises a plurality of sprocket wheels each provided with gear teeth having a different dent on teeth number into which the driving chain can be selectively geared. The free wheel includes a discoidal protective means mounted outside the minimum dent-numbered one of these sprocket wheels at the same interval as that at which the sprockets are mounted for preventing the driving chain from moving outwardly when it is engaged into any selected sprocket wheel.

9 Claims, 10 Drawing Figures

Patented March 14, 1972
3,648,519
3 Sheets-Sheet 1
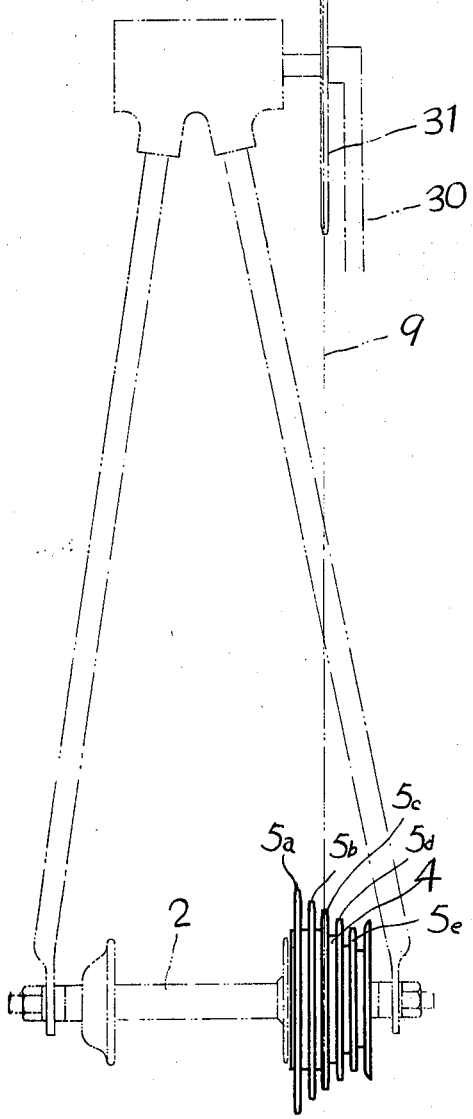
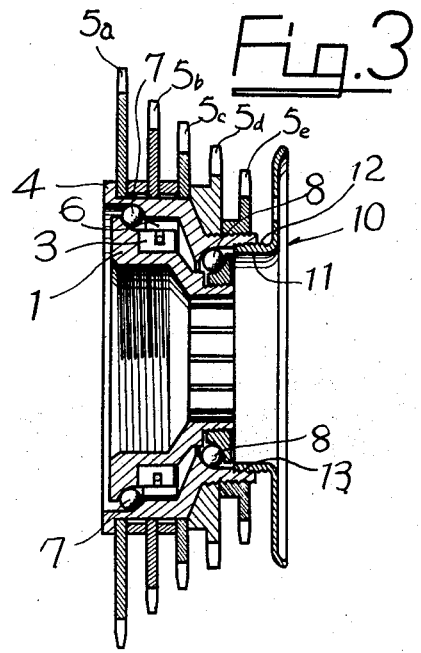
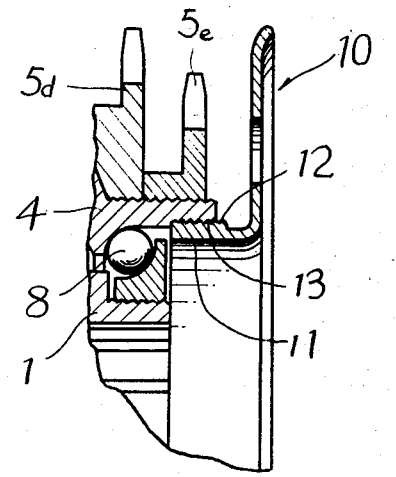
INVENTOR
KIKUNORI NAKATA
and ETSUJI KISHIDA
BY
ATTORNEYS

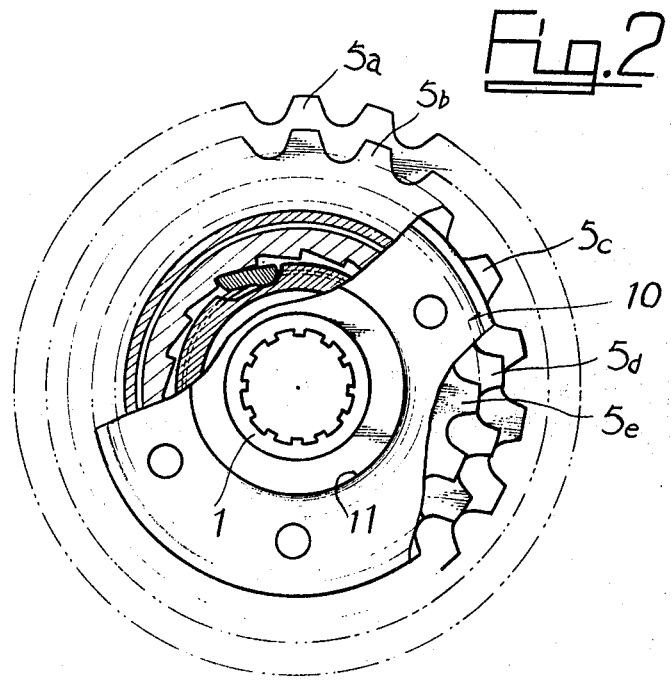
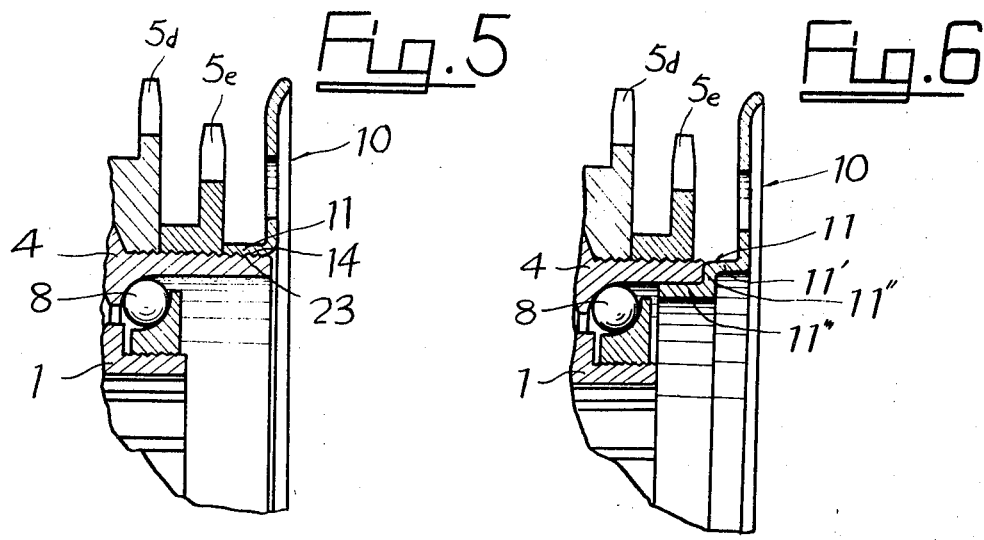

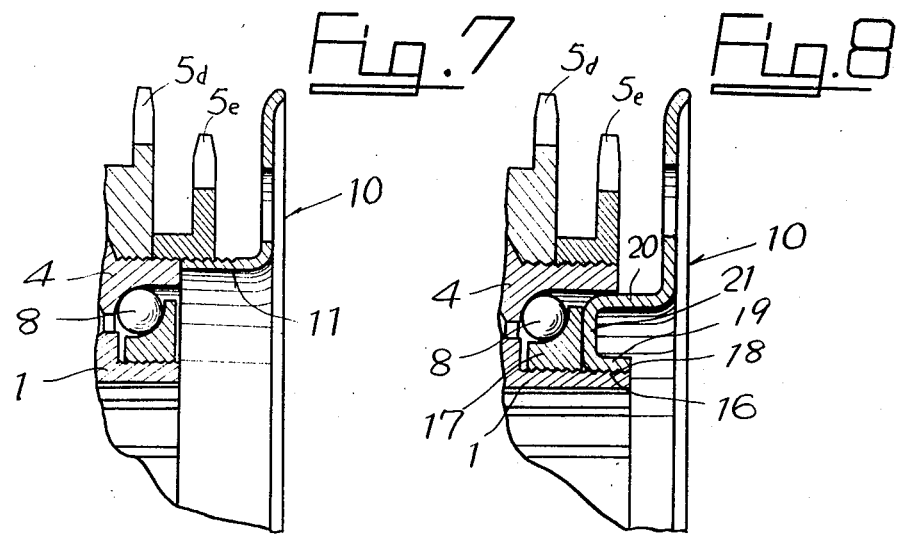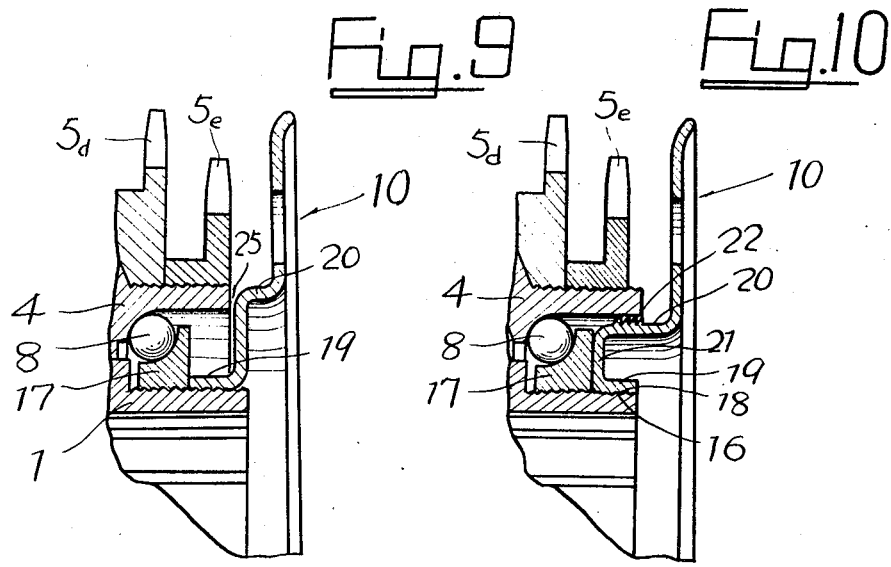

MULTIPLE FREE WHEEL FOR A BICYCLE

The present invention is related to a multiple free wheel for a bicycle, and more in particular to a multiple freewheeling system including a driving chain which, when engaged is prevented from coming off the sprocket wheel disposed farthest outwardly of the bicycle hub thereby continuously securing the gear shift operation of the bicycle.

Conventionally speaking, use is generally made of the so-called multiple freewheeling system which comprises a bicycle hub provided with a plurality of sprockets each having a different number of dents or teeth; and speed changes are effected by securing the driving chain into a sprocket wheel having a desired number of dents. However, the speed change operation is executed by moving the driving chain in the axial direction and, consequently it often occurs that the driving chain comes off the sprocket wheel disposed farthest outwardly of the bicycle hub.

On the top of that, the driving chain that has been disengaged is caught, for instance, between the rotating portions of the sprocket wheel and the fixed portions of the bicycle frame; thus if a cyclist still pedals the bicycle without being aware of this situation, the driving chain will be more tightly caught until at last it gives rise to the hazard that the rotating wheel becomes locked and stops all of a sudden, causing the bicycle to crash, or heavily damaging the driving chain and other parts of the bicycle. Moreover, considerable difficulties are experienced in replacing the tightly caught driving chain.

In the light of the above-mentioned difficulties, the present invention has as it object the prevention of the driving chain from coming off the sprocket wheel when a speed change is effected.

Accordingly, one of the principal objectives of this invention is to provide a multiple freewheeling system that when the chain drive is shifted into a sprocket wheel having the fewest number of teeth, the driving chain is completely prevented from coming off the sprocket wheel, as has been mentioned above, and, as a result, the chain is protected from being caught into the fixed portions of the bicycle frame and thereby assures safe and reliable operation of a bicycle at all times.

Another objective of the invention is to provide a multiple freewheeling system having the above-mentioned functions that is not merely simple in structure but is applicable to conventional bicycles as well.

Further another objective of the invention is to provide a multiple freewheeling system which prevents the penetration of dust, dirt, rainwater or the like into the bearing portions of the driving element on which a plurality of sprocket wheels are mounted in regularly spaced relation.

To be more precise, the present invention is concerned with a plurality of sprocket wheels which have different numbers of teeth which are driven into rotation at a given rate along with the driving operation by the driving chain selectively engaged into one of these sprocket wheels. Further the invention includes the driven elements fixed on the bicycle hub to which the rotation is transmitted only when the driving portion is driven for rotation in a fixed direction.

On the driving element, outwardly of and in regularly spaced relationship with respect to the sprocket wheel with the smallest number to teeth, is a discoidal barrier or protector which is mounted by means of a mounting device and has a greater periphery than the diameter of the adjacent sprocket wheel so that the driving chain is prevented from moving beyond the sprocket wheel even if the former is forcibly engaged. Thus the present invention primarily features the above-mentioned novel constructions which are hereinafter defined more in detail.

In the accompanying drawings showing the embodiments of the present invention,

FIG. 1 is a diagrammatical representation of the invention,

FIG. 2 is a frontal elevation view partially showing the principal elements thereof, FIG. 3 is a cross-sectional view of the principal element shown in FIG. 2, FIG. 4 is an enlarged partial cross-sectional view of the principal elements shown in FIG. 3, and FIGS. 5 thru 10 are illustrative of the other embodiments of the present invention showing partial cross-sectional view similar to FIG. 4, of the principal elements of the embodiments.

In the embodied constructions of the invention illustrated in the accompanying drawings, each of the identical reference numerals designated in this specification corresponds to one and the same part that is shown in the drawings, wherein numeral 1 indicates a socket type driven element screwed into the rear wheel hub of a bicycle and provided in its outer periphery with a pawl member 3 in the manner that rotating power is transmitted in a unilateral direction as far as the driving element which will be referred to hereinafter. Fixed on a driving element 4 are sprocket wheels 5a, 5b, 5c, 5d and 5e each having a different number of teeth and in the inside of the driving element 4 there is formed an inwardly faced ratchet means 6 corresponding with aforesaid pawl member 3.

In the drawings the sprocket wheels 5a thru 5e are shown as five wheels; but it is to be noted that the sprocket wheels are not restricted to the number of wheels displayed. The driving element 4 is rotatably supported on the driven element 1 by means of ball bearings 7 and 8. When the driving element 4 is rotated in the clockwise direction, the ratchet means 6 is brought into engagement with the pawl member 3 thereby to transmit the rotation of the driving element 4 to the driven element 1, whereas when the driving element 4 is rotated in the counterclockwise direction, its rotation is not transmitted to the driven element 1.

The rotation of the driving element 4 is transmissible when a driving chain 9 mounted on a front gear 31 fixed on a crank 30 rotatable by pedalling (see FIG. 1) is engaged with a desired one of the sprocket wheels 5a to 5e secured to the driving element.

In the drawings there is not shown the mode of operation of shifting the driving chain 9 into the selected one of the sprocket wheels 5a to 5e. In order to secure this driving chain shifting operation, an outer housing gear shift device is provided which is mounted separately on the side of the driving element 4 whereby the driving chain 9 is transferred along the axial direction of the driving element 4; for this purpose the conventionally well known type of a gear shift device is applicable enough to serve and, therefore, it is lacking in novelty worthwhile to special explanation and illustration.

When the pedal means is moved in the clockwise direction, the driving element 4 is also moved in the same clockwise direction by the selective engagement of one of the sprocket wheels 5a to 5e with the driving chain 9. On the other hand, when the pedal means is moved in the counterclockwise direction, the driving element 4 is also moved in the same counterclockwise direction through the above-mentioned means.

Incidentally, when the pedal means is moved in the clockwise direction, the rotation thereof is transmitted to the driven element 1. But when it is moved in the counterclockwise direction, the rotation thereof is transmitted to the driving element 4 only. In this case the driven element 1 is not subject to the rotation of the pedal means.

A discoidal barrier or protector 10 is shown whose periphery is greater in dimension than that of the sprocket wheel 5e which has the smallest number of teeth. The discoidal barrier 10 is provided in its center with a disk which is almost of the same diameter as the second fewest teeth-numbered sprocket wheel 5d disposed adjacent the sprocket wheel 5e which serves for shifting the bicycle speed into higher rate; the peripheral edge of said discoidal barrier 10 is curved outwardly and in the center thereof there is a perforated hole around which is formed a cylindrical structure 11. That is to say, the discoidal barrier 10 shown in FIGS. 3 thru 7 are all constructed in the manner that they can be mounted on the driving element 4, namely, on the main sprocket body on which the sprocket wheels 5a to 5e mounted and which is driven by the driving chain 9.

The discoidal barrier 10 shown in FIGS. 8 thru 10 are all constructed so that they can be mounted on the driven element 1, driven by the rotation transmitted from the driving element 4.

Referring to the constructions of FIGS. 3 thru 7, the axial direction of the driving element 4 is formed substantially longer than that of the driven element 1 as is clearly shown in FIG. 3 so that the outer end of the driving element 4 protrudes from the end of the driven element 1, consequently forming a space between the end of the driven element 1 and the inner periphery of the protruded outer end of the driving element 4.

According to the construction especially shown in FIG. 3, there is provided a thread channel 12 on the outer periphery of the cylindrical structure 11 of the discoidal barrier 10 and there is also provided a thread channel 13 on the inner periphery of the protruded portion of the driving element 4. The cylindrical structure 11 formed in the center of the discoidal barrier 10 is screwed into the inner peripheral surface of the protruded portion of the driving element 4 so that the discoidal barrier 10 is placed outwardly of and close to the sprocket wheel 5e having the smallest number of teeth and is in regularly spaced relationship therewith.

The distance between the sprocket wheel 5e and the adjacent discoidal barrier 10 is such that the driving chain 9 does not contact discoidal barrier 10 even if the driving chain 9 is engaged on the sprocket wheel 5e. Furthermore the driving chain 9 is disposed in such a predetermined space as to be directed along the discoidal barrier 10 into engagement with the sprocket wheel 5e when the driving chain 9 has been prevented from moving outwardly by the discoidal barrier 10.

According to the construction of the present invention, it is therefore possible that when the driving chain 9 is shifted into higher speeds while the bicycle is running, the discoidal barrier 10 prevents the driving chain 9 from coming off the smallest tooth-numbered sprocket wheel 5e and moving outwardly thereof so that the discoidal barrier 10 induces the driving chain 9 to engage securely with the smallest tooth-numbered sprocket wheel 5e. Due to the above-mentioned imperative functions of the discoidal barrier 10, it is possible to prevent the driving chain 9 from moving outwardly of the sprocket wheel 5e and, consequently, becoming caught into the fixed portions of the bicycle frame and the like. As has been mentioned, the discoidal barrier 10 is mounted on the driving element 4 operated by the driving chain 9 in order that it can rotate integrally with the sprocket wheel 5e. Thus, even if the driving chain 9 abuts against the discoidal barrier 10 there is no relative difference caused therebetween, thereby assuring the very reliable functions of the discoidal barrier 10; furthermore, even if the driving chain 9 abuts against the discoidal barrier 10 while the chain is in engagement with the smallest tooth-numbered sprocket wheel 5e disposed next to the discoidal barrier, there is no friction caused therebetween.

Incidentally it is possible to enhance the functions of the discoidal barrier 10 to the fullest extent merely by outwardly curving the outer periphery of the discoidal barrier 10 for guiding the driving chain 9 smoothly. For guidance purposes, a plate of synthetic resin, as well as a metallic plate, is employable as the discoidal barrier 10.

According to the present invention it is also possible to improve the outer appearance of the discoidal barrier 10 by providing any preferred designs and apertures in the intermediate portion thereof as illustrated in the drawings.

The attachment of the discoidal barrier 10 onto the driving element 4 is accomplished not only by screwing the discoidal barrier 10 to the driving element 4, as has been mentioned above but also by tightly mounting the discoidal barrier 10 around the inner peripheral surface of the protruded portion of the driving element 4. In addition, the attachment is replaceable with that shown in FIGS. 5 thru 7. Namely, in FIG. 5 a driving element 4 is shown having space for one more sprocket wheel than the number of the speed transmitting hub portions to be formed; in case with a five-speed bicycle hub transmitting system, for example, a six-speed transmissible driving element 4 is adapted on which can be mounted six wheels of the sprocket respectively having different numbers of teeth. In the inner peripheral surface of the cylindrical structure 11 formed in the center of the discoidal barrier 10 there is provided a thread channel 14. Thus the discoidal barrier 10 is screwed by means of the thread channel 14 into the thread channel 23 corresponding to the space for the sixth sprocket wheel on the driving element 4. In this case the cylindrical structure 11 is provided in such a manner that when the discoidal barrier 10 is screwed, the distance between the latter and the smallest tooth-numbered sprocket wheel 5e is just same as the length of the cylindrical structure 11 and the extreme end thereof abuts against the outer surface of the sprocket wheel 5e.

In FIG. 6 a construction is shown comprising a larger diameter cylindrical structure 11', a vertical or transversely extending cylindrical structure 11" and a smaller diameter cylindrical structure 11''', respectively formed in the manner that is explained hereinafter. Namely, the larger diameter cylindrical structure 11' is formed by providing the cylindrical structure 11 having its outer diameter almost same as the outer diameter of the outside end of the driving element 4; the vertical cylindrical structure 11" is formed by curvedly extending a portion of the cylindrical structure 11 from a free end of the larger diameter cylindrical structure 11' toward the center thereof in the direction of radius and bringing the portion into contact with the outside end of the driving element 4; and the smaller diameter cylindrical structure 11''' is formed by extending it from the inside end of the vertical cylindrical structure 11" in the same direction of the larger diameter cylindrical structure 11' and sealingly contacting it to the inner peripheral portion of the driving element 4.

The smaller diameter cylindrical structure 11''' is brought into contact with the inner peripheral surface of the driving element 4, consequently, sealingly engaging it on the driving element 4.

In FIG. 7 a construction is shown in which the axial length of the driving element 4 is shortened and a plurality of differently tooth-numbered sprocket wheels 5a to 5e are provided thereon, a certain portion of the smallest tooth-numbered sprocket wheel 5e is formed so that it protrudes from the outside end of the driving element 4 outwardly in the axial direction thereof. Accordingly it is possible to mount the discoidal barrier 10 by screwing it onto the protruding portion of the sprocket wheel 5e. The cylindrical structure 11 has a thread channel formed on its outer periphery for effecting the attachment of the barrier 10 to the sprocket wheel 5e. In this case, the length of the cylindrical structure 11 is determined so that the distance between the discoidal barrier 10 and the smallest tooth-numbered sprocket wheel 5e screwed to each other can be fixed as desired.

All that have been mentioned above refer exclusively to the constructions according to which the discoidal barrier 10 is mounted on the driving element 4 or the main sprocket body shown in FIGS. 3 thru 7. But it is also possible to mount the discoidal barrier 10 on the driven element 1 as is shown in FIGS. 8 thru 10.

According to the constructions shown in FIGS. 8 thru 10, the axial length of the driven element 1 is made almost the same as or a little longer than that of the driving element 4 and on the outer circumference of the extended end portion of the driven element 1 there is provided a thread channel 16 into which are screwed both a ball race 17 for supporting a ball 8 and a discoidal barrier 10 which is formed in the manner explained hereinafter.

In FIG. 8, the discoidal barrier 10 is formed of an internal cylinder 19 and an external cylinder 20. The internal cylinder has its inner diameter the same as the outer diameter of the driven element 1 and is provided with a thread channel 18 engageable with the thread channel 16 on the driven element 1. The external cylinder 20 is disposed coaxially of the driving element 4 and has a slightly smaller diameter than the inner diameter of the side portion of the driving element 4. A diametrally disposed vertical cylinder 21 serves to connect both the internal cylinder 19 and the external cylinder 20.

The mounting of the discoidal barrier 10 in FIG. 8 is accomplished by screwing the thread channel 18 of the internal cylinder 19 into the thread channel 16 of the driven element 4. In this case, the screwing of the discoidal barrier 10 is restricted because it is brought into abutment against the outer end of the ball race 17 and, therefore, the discoidal barrier 10 in this restricted state is mounted at the above-mentioned distance from the outside of the farthest outwardly disposed smallest tooth-numbered sprocket wheel 5e. Incidentally, the construction of the discoidal barrier 10 shown in FIG. 8 is modifiable as is shown in FIG. 9.

In this FIG. 9 a construction is shown such that an external cylinder 20 is disposed outwardly of the driving element 4, being provided with a larger diameter than the inner diameter of the flank of the driving element 4; thus, when the internal cylinder 19 is screwed to the driven element 1, there is produced a small gap 25 between the outer surface of the driving element 4 and the inner surface of the external cylinder 20, namely, the opposed surface thereof to the driving element 4, and these two cylinders 19 and 20 are connected to each other by means of the vertical cylindrical structure 21. In this case the vertical cylindrical structure 21 does not altogether need be disposed in one and the same horizontal plane all over the surface, since it can be fitted to the configuration of the outer surface of the driving element 4 by forming the vertical cylindrical structure 21 into curvatures fitting to the configuration.

In the above-mentioned manner the discoidal barrier 10 is mounted with its mounting portion disposed close to the external surface of the driving element 4 so that the opening portion normally left open between the driving element 4 and the driven element 1 is sealingly closed up by the discoidal barrier 10. Accordingly, the penetration of dust, dirt, rainwater or the like can be completely prevented, and the sealing effect is also conspicuously enhanced upon such bearing means and one-sided directed rotation transmission device. Furthermore, if a jagged annular channel 22 is provided around the outer periphery of the external cylinder 20 in the position where the outer periphery is placed close to the inner peripheral surface of the driving element 4 as is shown in FIG. 10, then the external cylinder 20 and the driving element 4 are both placed extremely close to each other, consequently giving a labyrinth effect upon this closely disposed portion and increasing its sealing effect.

It is thought that the invention and many of its attendant advantages will be understood from the foregoing description, and it will be apparent that various changes and modifications may be made in the form, construction and arrangement of the parts without departing from the spirit and purview of the invention or sacrificing all of its material advantages, the form hereinbefore described being merely a preferred embodiment thereof.

What is claimed is:

1. A multiple free wheel for a bicycle characterized in comprising the following means;
   a. a plurality of sprocket wheels each having different numbers of teeth,
   b. a driving element for fixing thereon said plural sprocket wheels in regularly spaced relation, a driving chain selectively engageable with any one of said plural sprocket wheels for driving the engaged sprocket wheel,
   c. a driven element rotatably mounted in the inside of said driving element by means of a ball bearing,
   d. a one-sidedly directed rotation transmissible means which is positioned between said driving element and said driven element, for transmitting the unilaterally directed rotation only of said driving element as far as said driven element,
   e. a discoidal protector means disposed outwardly of the sprocket wheel which has the smallest number of teeth and is located farthest outwardly of said driving element and said discoidal protector means is spaced from said sprocket wheel at the interval equal to the distance spanning between said plural sprocket wheels; said discoidal protector means comprising a disk portion having the circumference of a larger diameter than the diameter of said sprocket wheel having the smallest number of teeth, and a mounting means extending in a unilateral direction from the center of said disk portion.

2. A multiple free wheel for a bicycle characterized in comprising the following means;
   a. a plurality of sprocket wheels each having a different number of teeth,
   b. a cylindrical driving element for fixing thereon said plural sprocket wheels in regularly spaced relation, a driving chain selectively engageable with any one of said plural sprocket wheels for driving the engaged sprocket wheel,
   c. a driven element rotatably mounted in the inside of said driving element by means of a ball bearing,
   d. a one-sidedly directed rotation transmissible means which is positioned between said driving element and said driven element, for transmitting the unilaterally directed rotation only of said driving element as far as said driven element,
   e. a discoidal protector means is disposed outwardly of the sprocket wheel which has the smallest number of teeth and is located farthest outwardly of said driving element and said discoidal protector means is placed closest to said sprocket wheel at the interval equal to the distance spanning between said plural sprocket wheels; said discoidal protector means comprising a disk portion having the circumference of a larger diameter than the diameter of said sprocket wheel having the smallest number of teeth, and a cylindrical structure fixed on said driving element.

3. A multiple free wheel for a bicycle defined in the claim 2, wherein there are provided said driving element, said driven element sleeved on said driving element, said means for transmitting the unilaterally directed rotation only of said driving element as far as said driven element, and said discoidal barrier means fixed on said driving element; comprising the following means,
   a. a thread channel formed in the inner peripheral surface of the outer portion of said driving element,
   b. said cylindrical structure which is protruded from one end intermediate said disk portion forming said discoidal protector means and is applicable to the inner surface of the outer portion of said driving element,
   c. a thread channel being screwable to said thread channel formed around the outer periphery of said discoidal barrier means.

4. A multiple free wheel for a bicycle defined in the claim 2, comprising the following means;
   a. said cylindrical driving element which is elongated in the axial direction of the sprocket wheels mounted about the outer periphery thereof and formed with a thread channel in the outer periphery of said elongated portion thereby making it possible to mount on said driving element a sprocket means having one more wheel than the desired number,
   b. a driven element rotatably mounted in the inside of said driving element,
   c. a means positioned between said driving element and said driven element, for transmitting the unilaterally directed rotation only of the driving element as far as said driven element,
   d. a cylindrical structure which comprises a disk portion having a larger circumference than the outer diameter of said sprocket wheel having the smallest number of teeth, and is protruded in the coaxial direction of said driving element from one end intermediate said disk portion, and whose inner diameter fits to the outer diameter of said elongated portion of said driving element, and within the limits of said inner diameter there being provided a thread channel screwable to the thread channel of said driving element; said cylindrical structure being also of such a suitable length that one end thereof abuts against the outside of said sprocket means having the smallest number of teeth thereby to secure a regular space therebetween.

5. A discoidal barrier means for the multiple bicycle free wheel defined in the claim 2, comprising the following means;
   a. a disk portion mounted on the outside of said driving element in the regularly spaced and mutually disposed relationship with respect to said sprocket wheel having the smallest number of teeth,
   b. a larger diameter cylindrical structure protruded toward one side of said disk portion from the intermediate portion thereof and, having almost the same diameter as the outer diameter of the outside portion of the driving element,
   c. a vertical surface curvedly extending from a free end of said larger diameter cylindrical structure toward the center thereof in the direction of radius, and abutting against the outer end of the driving element,
   d. a smaller diameter cylindrical structure extending from the inner end of said vertical surface in the same direction of said larger diameter cylindrical structure, being tightly sealed to the inner circumferential surface of the outside surface of the driving element.

6. A multiple free wheel for a bicycle defined in the claim 2, which is composed of a driving element, a driven element sleeved on said driving element, a means for transmitting the unilaterally directed rotation only of said driving element as far as said driven element, and also of a discoidal protector means which comprises the following means;
   a. a disk portion having a larger circumference than the diameter of said sprocket wheel having the smallest number of teeth,
   b. an inner cylindrical structure having a thread channel screwable to a thread channel fromed in the outer periphery of said driven element,
   c. an outer cylindrical structure disposed closest to the outside portion of said driving element thereby forming a slight clearance,
   d. a surface extending in the direction of radius thereof and connecting said inner cylindrical structure and said outer cylindrical structure.

7. A multiple free wheel for a bicycle characterized in comprising the following means;
   a. a plurality of sprocket wheels each having a different number of teeth,
   b. a driving element composed of a cylindrical structure whereon said sprocket wheels are mounted at regular intervals; said driving element being substantially shorter to such an extent that when said sprocket wheels are mounted on said cylindrical structure, a portion of said sprocket wheel having the smallest number of teeth and disposed farthest outwardly of said sprocket wheels is protruded in the axial direction of said cylindrical structure from the outside thereof,
   c. a driven element rotatably mounted in the inside of said driving element by means of a ball bearing,
   d. a means positioned between said driving element and said driven element, for transmitting the unilaterally directed rotation only of said driving element as far as said driven element,
   e. a discoidal protector means which is disposed outside said sprocket wheel farthest outwardly of said driving element, and mounted close to said sprocket wheel at the interval equal to the distance spanning between said plural sprocket wheels, comprising a cylindrical structure that includes a disk portion having a larger circumference than the outer diameter of said sprocket wheel having the smallest number of teeth and extending in a unilateral direction from the center of said disk portion until it is screwed to the protruded portion of the driving element geared into said sprocket wheel having the smallest number of teeth; said cylindrical structure having a thread channel in its outer periphery and being substantially of such a suitable length that said disk portion is disposed at any desired regular interval with respect to said sprocket wheel while at the same time being in the state screwable to said protruded portion through said thread channel.

8. A multiple free wheel for a bicycle characterized in comprising the following means;
   a. a plurality of sprocket wheels each having a different number of teeth,
   b. a driving element on which said plural sprocket wheels are secured at regular intervals; a driving chain selectively engageable with any one of said plural sprocket wheels for driving the engaged sprocket wheel,
   c. a driven element which has almost the same length as the axial length of said driving element, and is rotatably mounted in the inside thereof; in the outer periphery of the outside portion of said driven element there being provided a thread channel and a ball race means secured to said thread channel,
   d. a means positioned between said driving element and said driven element for transmitting the unilaterally directed rotation only of said driving element as far as said driven element,
   e. a discoidal protector means which is disposed in the outside of said sprocket wheel having the smallest number of teeth and farthest outward of the driving element and mounted into the thread channel of the outside portion of said driven element at the interval equal to the distance between the mutually adjacent sprocket wheels; said discoidal protector means including a disk portion of a larger circumference than the diameter of said sprocket wheel having the smallest number of teeth and a fixing means secured to said driven element.

9. The discoidal barrier means for the multiple bicycle free wheel defined in claim 8, comprising the following means;
   a. a disk portion mounted on the outside of the driven element and disposed close at a regular interval to the outside of said sprocket wheel having the smallest number of teeth and located farthest outwardly of the driving element,
   b. an inner cylindrical structure disposed on one side of said disk portion and screwed to the driven element,
   c. an outer cylindrical structure comprising a cylinder which is protruded from said disk portion and larger in diameter than said inner cylindrical structure, but being smaller than the inner diameter of the outside of the driving element, and around the outer circumference of said outer cylindrical structure there being provided a jagged annular thread channel disposed close to the inner periphery of the outside portion of said driving element, and
   d. a surface extending in the direction of radius thereof and connecting said inner cylindrical structure to said outer cylindrical structure.

* * * * *